May 10, 1960   H. DU VAL, JR., ET AL   2,936,406
CONTROL SYSTEMS AND APPARATUS
Filed Sept. 24, 1956   6 Sheets-Sheet 1

INVENTORS.
HERBERT DUVAL JR
BY   RALPH R. BATCHER

May 10, 1960 H. DU VAL, JR., ET AL 2,936,406
CONTROL SYSTEMS AND APPARATUS
Filed Sept. 24, 1956 6 Sheets-Sheet 2

INVENTORS
HERBERT DUVAL JR.
RALPH R. BATCHER
BY

May 10, 1960 H. DU VAL, JR., ET AL 2,936,406
CONTROL SYSTEMS AND APPARATUS
Filed Sept. 24, 1956 6 Sheets-Sheet 3

INVENTORS
HERBERT DUVAL JR
RALPH R. BATCHER
BY

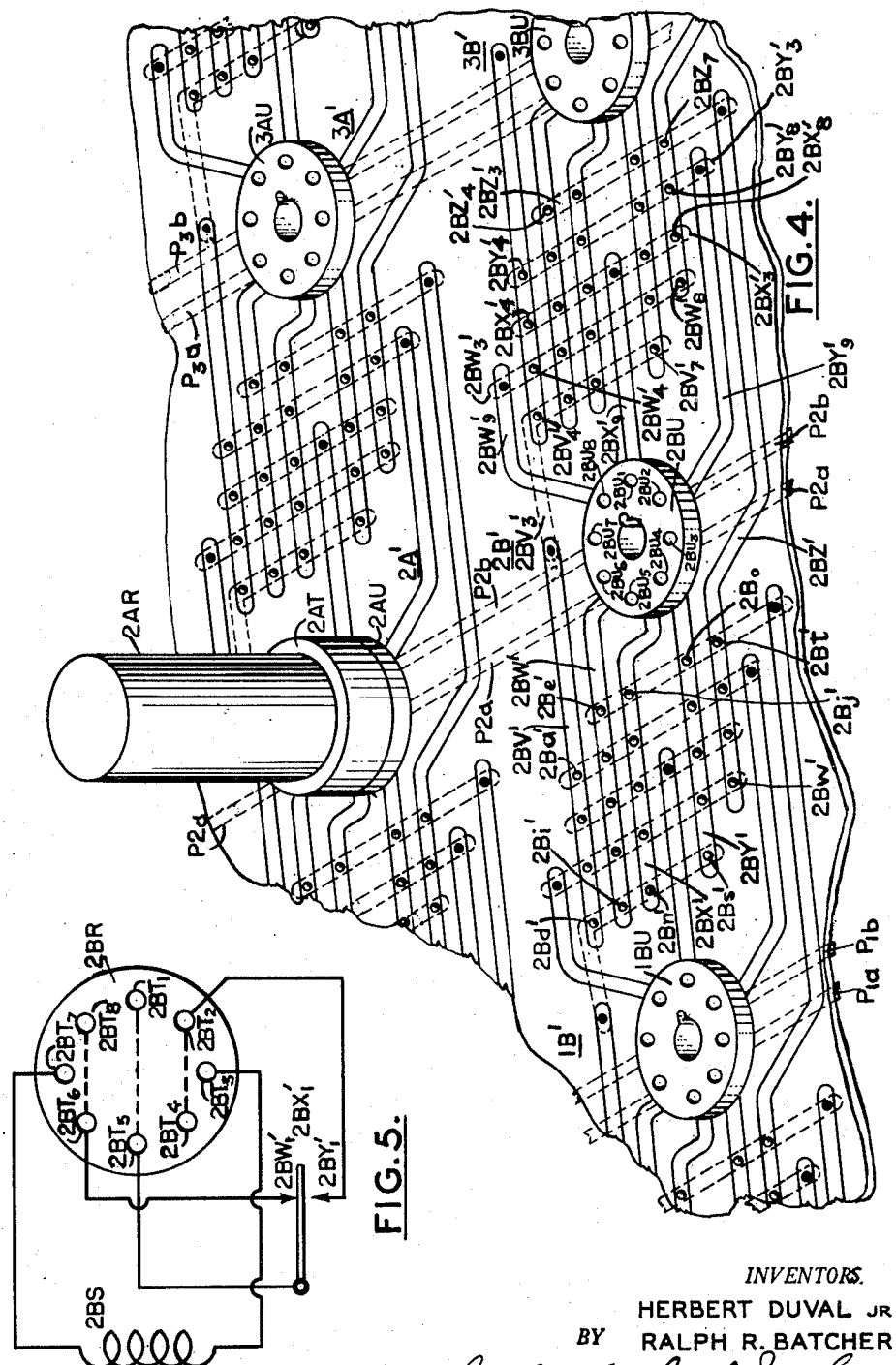

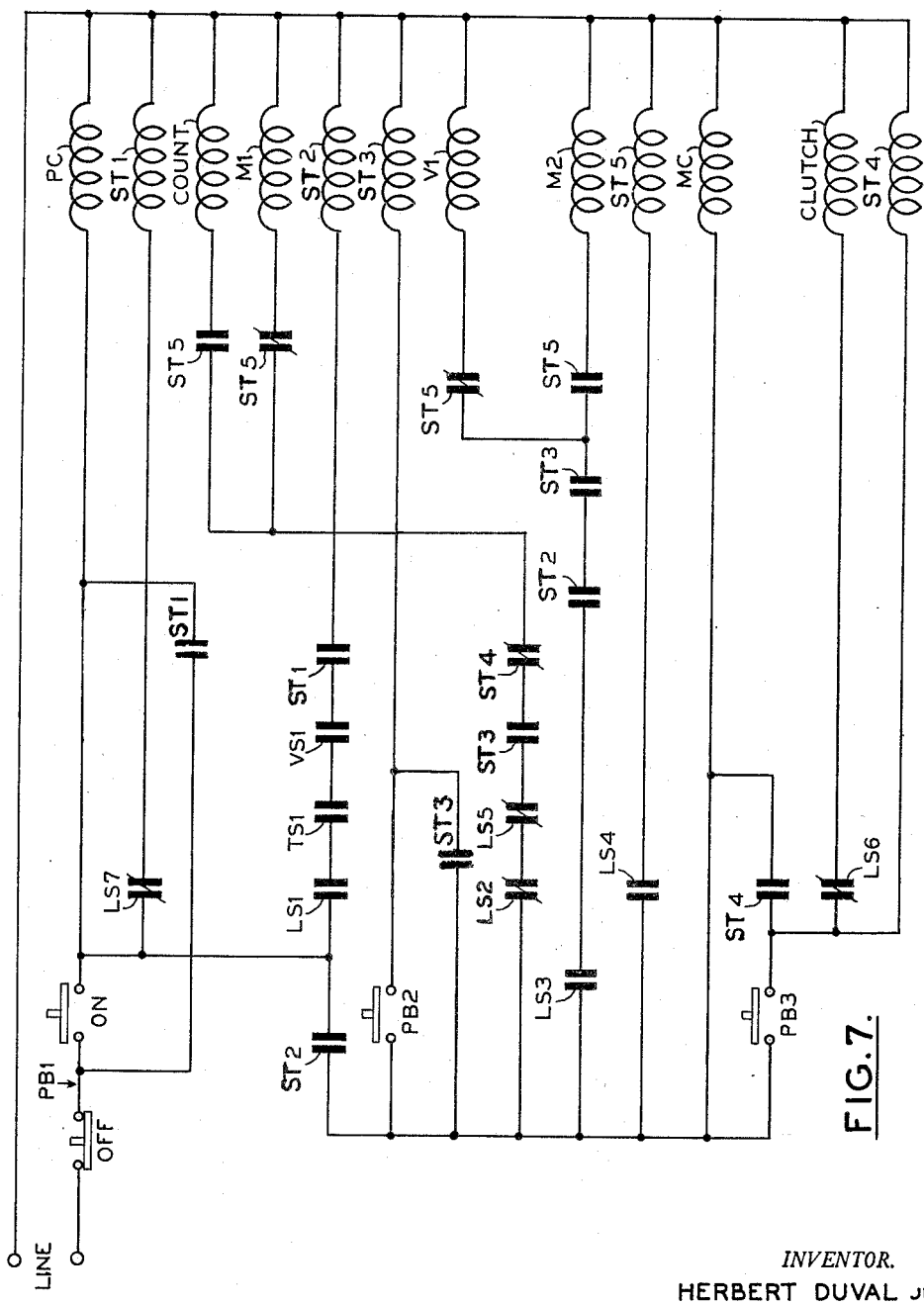

United States Patent Office 2,936,406
Patented May 10, 1960

2,936,406

CONTROL SYSTEMS AND APPARATUS

Herbert Du Val, Jr., Huntington, and Ralph R. Batcher, Douglaston, N.Y.

Application September 24, 1956, Serial No. 611,527

13 Claims. (Cl. 317—99)

This invention relates to the design of control systems and more particularly to novel and highly effective methods and means enabling control systems to be devised with a minimum of selling, engineering and manufacturing cost and effort regardless of their complexity.

In recent years, a great deal of attention has been given by technical and management personnel to the problem of automatic controls in industry, i.e., the field of automation. Automatic controls have been developed for many industrial operations, including complete factory operation as in the chemical industry, machine tool operations, and materials handling operations. In the main, however, the effort has been not to develop new methods of control but rather to adapt new accessories such as electronic circuits and measuring devices to the control problem. The same heavy duty control equipment (e.g., relays and contactors) has been employed as heretofore and it has been sold by the same selling techniques, and adapted to control applications by the same engineering and manufacturing methods that have been used previously. The costs of selling, engineering and manufacturing using these techniques have risen, and indications are that they will continue to rise. Each control system design encountered is usually unique to that particular operation and hence each must be sold, engineered and manufactured individually, whereby the advantages of mass production do not obtain.

It is an object of this invention to provide new and improved methods and devices that will reduce the costs of selling, engineering, manufacturing and testing electrical control systems.

A further object of the invention is to provide a flexible control assembly which enables even the most complex control system to be constructed with a minimum of human effort and ingenuity.

Another object of the invention is to provide the advantages of mass production in the construction of one-of-a-kind electrical systems of control.

A still further object of the invention is to reduce substantially, or eliminate, the need for wiring diagrams, layout drawings, manufacturing drawings and the like in constructing complicated electrical control systems whereby such systems may be manufactured speedily and economically.

Still another object of the invention is to provide an electrical control system that may be changed or enlarged as desired with ease, and without making obsolete any existing part thereof.

Industrial control systems of modern types include many independent operating devices that must be supervised, monitored and adjusted continuously. These controlled devices are usually power items of some sort, such as, for example, motors, ovens, valves, lights, rheostats, transformers, amplifiers, computers, alarms and the like, each of which is independently controlled by the occurrence of a selected combination of conditions that are set up by a group of sensing elements that monitor the flow of the product or the steps in the process being controlled. This requires that the power devices on one hand, and the sensing elements on the other be interconnected by systems of intricate circuits. For example, a motor may be turned on only when a particular combination of temperature levels, flow rates, the presence of items being worked on, or other conditions are met. Sometimes, in addition, the speed of this motor may have to be altered when still another group of conditions are met.

Each control system will have its own group of controlled items. The interconnection system that brings about these combinations of control conditions must be individually engineered and manufactured. Sometimes the designer, in order to reduce the complexity of the system, settles for less-than-optimum results, and so limits the efficiency of the system and the quality of the product produced thereby.

Each industrial control problem requires engineers to analyze thoroughly all phases of the problem; to determine the interconnection circuits; to make assembly drawings; to select the devices that will handle the various operations; and to make detailed cable wiring diagrams. Indeed, a great deal of this work and expense may have to be done for the purpose of making a sales proposal to a prospective customer, and since there are many more sales proposals prepared than actual sales, the cost of selling control systems of this general character is a substantial item of general expense.

Each system sold must be assembled, wired and tested, and this is work requiring much time by specialized operators, the cost of which may be several times the cost of the physical items that go into the system.

Basically, in any control system adapted to handle any problem automatically, every action in a given part of the system might be called upon to affect every other part of the system in one of the following three ways: it may turn something on, either abruptly or gradually; it may turn something off in the same manner; or it may leave it alone, that is, exert no effect. Therefore, a truly universal control system that will handle all types of industrial conditions must be arranged so that every happening, as determined by some type of commonly used sensing elements can apply a control effect to one or more items in one of the above three ways. Electrical control systems embodying the invention operate on this principle, and do so in a manner that does not require the inordinate amount of interconnection controls that would be needed if the usual permutation rules were to be applied. The almost limitless possibilities of the circuit interconnections have made it impractical heretofore to attempt universal control layouts that would utilize basic mass produced modules wired together without special cables.

The sensing devices referred to above may be manual switches, limit switches, pressure contactors, photocell devices, thermal devices, or any other instrument being controlled and thereupon produce a controlling signal of an electrical nature. In some cases, these sensing elements may be required to function through electronic circuits, magnetic amplifiers, amplidynes, or other like apparatus to provide abrupt or gradual modifications of the original signal. Usually, the signals from several sensing elements are combined so that some control effect is introduced only after a specified combination of conditions obtains. In some cases, the signals from several sensing elements may be coordinated through a computer, for example, so as to provide a response in accordance with a given formula or other operating relation.

Universal control systems utilizing basic modules capable of being easily mass produced are made possible for the first time, according to the invention, by the provision of a novel and highly effective array of like or similar components that are capable of interconnection in a simple manner to form any specific control system that may be needed. More specifically, the array of components may be a mosaic comprising a plurality of tiers or stacks of substantially aligned circuit modules, the elements of each tier being connected for simultaneous operation by actuator means, such as an electromagnet, or by a group of electromagnets connected in parallel. Also, the modules in this mosaic are arranged so that those in each tier are in substantial alignment with similar modules in other, adjacent tiers so that an electrical circuit, or several circuits as in a multiphase system, to perform one or more specific functions can be formed by inserting simple conductor means between certain terminals in the respective modules in a row. The interconnected modules in each row are adapted to handle one or more effects to be accomplished, whereas each tier of modules may represent a controlling cause or condition, which, when it occurs, allows those controlled effects to be put into operation.

These modules can all be identical, both as to construction and as to the way they are mounted. Such basic functioning using an array of identical modules can be accomplished, according to the invention, when each module comprises a pair of normally closed contacts, a pair of normally open contacts and, in addition, one or more fixed or feed-through conductors. Thus, each module may include a movable member carrying a contact which normally engages a first fixed contact, and which is adapted to be moved, simultaneously with other similar movable contact carrying members in its tier, to bring the contact thereon out of engagement with the first fixed contact and into engagement with a second fixed contact. The fixed or feed-through conductors are adapted to be utilized when the controlling effect produced by a tier is not required to affect some controlled power device. Actually, it seems that two such fixed conductors are sufficient to handle such functions in any module, and so, in the following description, two fixed by-pass conductors will be provided as a part of each switching module, in addition to the above-mentioned movable and fixed contacts. Thus, there are five possible electrical circuits through each module.

As each control application has a different arrangement of intercoordinated conditions to be handled, the number of tiers required and the number of switching elements in each tier will vary depending on the complexity of the problem to be handled. A typical assembly, for example, might include twelve tiers of switching modules, each tier comprising five or six units. Another problem might require as many as a hundred or more modules assembled in some other arrangement, while a third might need only a few.

For better understanding of the invention, reference is made to the following detailed description of several typical embodiments taken in conjunction with the accompanying drawings, in which:

Fig. 2b is a view in elevation of the assembly portion shown in Fig. 2a;

Fig. 3b is a view in elevation of the module shown in Fig. 3a;

Fig. 4 is a partial view in perspective of another form of universal control assembly according to the invention;

Fig. 5 is a schematic diagram of a typical electrical circuit for one of the modules in the assembly of Fig. 4;

Fig. 7 is a conventional "cross-the-line" circuit diagram for the control system depicted in Fig. 6.

Figure 1:
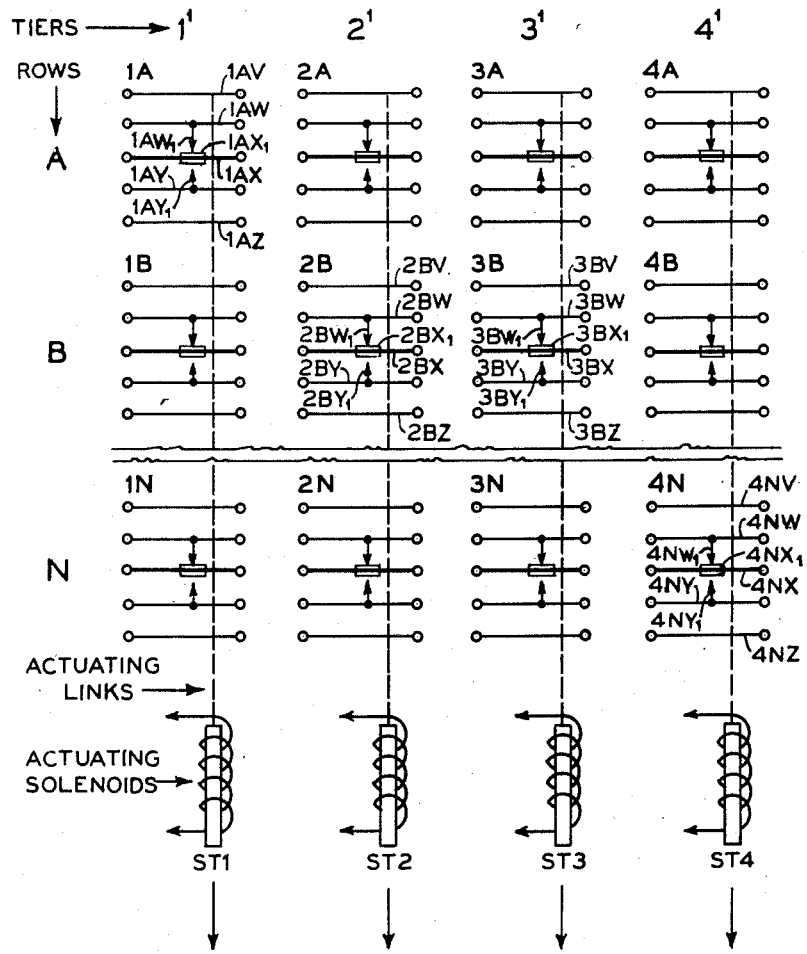
Fig. 1 is a schematic diagram of an array of modules in rows and tiers according to the invention.

Fig. 1 illustrates schematically the electrical circuitry of a representative control system mosaic constructed according to the invention. It comprises a plurality of tiers 1'–4', inclusive, of similar electrical modules, those in the tier 1' being designated by the reference characters 1A, 1B . . . 1N, respectively. Each of the other tiers includes a like plurality of these electrical modules, each module being designated by combining the reference characters for the row and tier in which it is located. Thus, the module in the 1' tier and A row is designated by the reference character 1A.

For simplicity, all of the electrical modules in Fig. 1 are the same, although in some cases this may not be needed or desirable as indicated below. It will be necessary, therefore, to describe only one in detail, corresponding parts in the others being designated by corresponding reference characters combined with the designation for the particular module in each case. Thus, the module 1A includes a plurality of stacked circuit elements 1AV, 1AW, 1AX, 1AY and 1AZ, one or more of which may serve a feedthrough function to carry a circuit from a module in one row and tier to another module in the same row but in a different, usually adjacent tier. Additionally, the element 1AX carries a movable contact $1AX_1$ which normally engages a fixed contact $1AW_1$ connected to the element 1AW, but which, when moved, is adapted to be disengaged from the fixed contact $1AW_1$ and brought into engagement with a fixed contact $1AY_1$ electrically connected to the element 1AY.

The movable contact $1AX_1$ is ganged with the corresponding movable contacts of the modules in the tier 1' for simultaneous actuation by a coil or solenoid $ST_1$. Similar coils $ST_2$, $ST_3$, and $ST_4$ are provided for simultaneously actuating the movable contacts of the modules in the tiers 2', 3' and 4', respectively.

Each of the circuit elements in a module has an input terminal and an output terminal, and the output terminals of each module are located in close proximity to the input terminals of the next adjacent module to facilitate the making of connections between the two sets of terminals.

As a simple illustration of one way in which the electrical control system mosaic shown in Fig. 1 might be used, let it be assumed that one requirement of a particular control problem is that a specified function be initiated only after one or more conditions have been established. An easy solution according to the invention is to provide circuits to cause appropriate ones of the coils $ST_1$–$ST_4$, inclusive, to be energized upon establishment of the controlling conditions, and to connect appropriate ones of the elements of the modules in one row by short conductive links to form a circuit to initiate the specified function.

Since each module performs a basic set of functions only, an array of such modules becomes a design tool for setting up a control system. A designer then concerns himself mainly with the correct location of the intermodule connections which differ with each system. In order that these interconnections can be duplicated easily in the final installation, it is essential that all connections be made in a simple manner without elaborate wiring leads or cabling.

To better understand the technique illustrated in Fig. 1, it may be helpful to refer briefly to the two forms of circuit representation currently in use in engineering design, viz: (1) the form used in radio circuit diagrams where all parts of a given component are shown at one location on the diagram, and where all wires are depicted going to the specific terminals at this location; and (2) the form of circuit diagram used in industrial control layouts, sometimes called the "across-the-line" diagram, where the elements of a given component such as a relay, may appear at different locations on the diagram, so that a simple short line can be drawn that will show the connections between each pair of elements usually without the use of crossovers.

In the latter form of diagram, the wiring schematic appears simpler to understand, although the actual wiring cables in an assembly would be just as complicated as they might appear on the so-called "radio" type of diagram presentation. Moreover, there is no direct relation between the "across-the-line" diagram showing the connections, and the actual cabling in the apparatus. Hence, complete conversion layout drawings must be prepared to permit the wiring cables to be installed.

With the module assembly of the present invention, however, in which all circuit elements affecting the condition of a given circuit are disposed in a row in substantial alignment, and all circuit elements adapted to respond to the same conditioning effect are disposed in the form of a tier for simultaneous actuation upon occurrence of the conditioning effect, the actual circuit as constructed is substantially identical with the form in which it appears in a circuit diagram, and is as simple as the conventional "across-the-line" circuit diagram.

Moreover, as will be shown hereinafter, it is possible to provide a code to represent the connections that are required for automatic control systems to link up the electrical circuits between the modules. Such a code is well adapted to be applied to punched-card or other forms of controlled connection inserters in the final manufacture. The code provides all the information necessary to connect up any group of mass-produced modules that makes up the modular assembly that will handle the particular operational functions required for the process being handled.

One practical form of modular electrical control system mosaic according to the invention is shown in Figs. 2a, 2b, 3a and 3b. Only the portion including the modules 2A, 2B, 2C, 3A, 3B and 3C is shown since this is sufficient to illustrate the salient features of the invention. As previously stated, the modules are identical and it will be necessary to describe only one, say the module 2B, in detail.

Figure 3A:
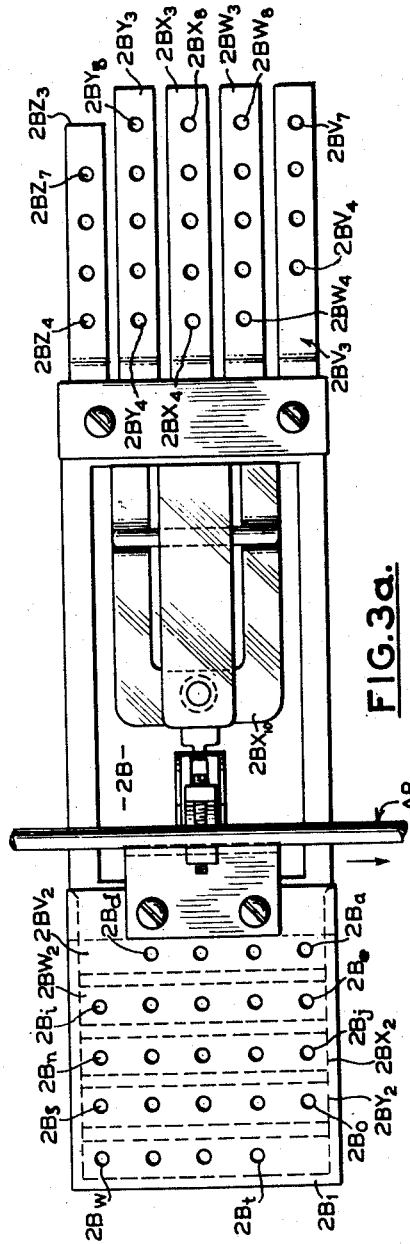
Fig. 3a is a plan view of one module of the type used in the assembly of Figs. 2a and 2b.
Figure 3B:
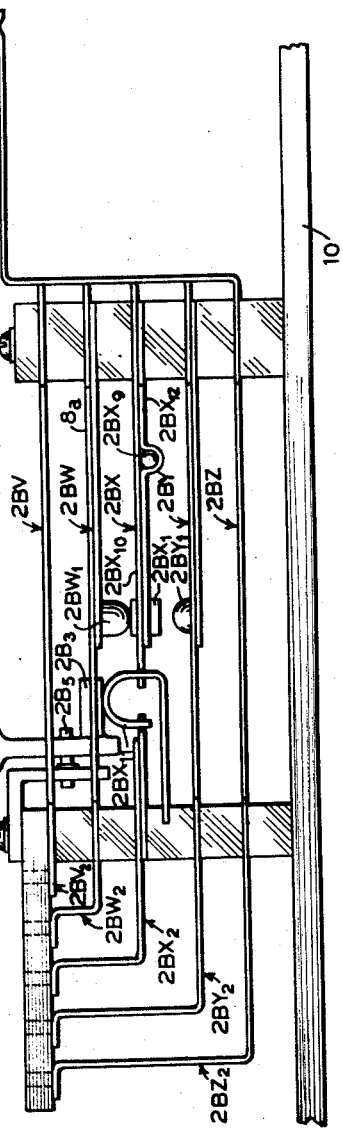

Referring now to Figs. 3a and 3b, the five circuit elements 2BV, 2BW, 2BX, 2BY and 2BZ of the module 2B are secured in insulated spaced apart relation on a base 10. The element 2BV is a strip of conducting metal having an end portion $2BV_2$ lying beneath part of an insulated terminal board $2B_1$. The board $2B_1$ has formed therein a row of laterally spaced holes $2B_a$—$2B_d$ into which connectors such as screws or the like may be inserted to effect electrical connections as described in greater detail below. The other end of the element 2BV terminates in a conducting strap $2BV_3$ in which are formed a plurality of longitudinally spaced holes $2BV_4$—$2BV_7$, inclusive, through which connectors such as screws or the like may be inserted to effect connections to one or more of the five circuit elements in the next succeeding module in the same row (i.e., the module 3B).

The element 2BW, which carries the fixed contact $2BW_1$ also comprises a strip of conducting metal. It lies below the element 2BV and it has an input end portion $2BW_2$ lying beneath a plurality of laterally spaced screw connector holes $2B_e$—$2B_i$, and an output connector strap $2BW_3$ provided with a plurality of longitudinally spaced screw connector holes $2BW_4$—$2BW_8$.

The circuit element 2BX also has an input end portion $2BX_2$ underlying a plurality of laterally spaced connector holes $2B_j$—$2B_n$ in the terminal board $2B_1$. It also has an output terminal strap $2BX_3$ provided with connector holes $2BX_4$—$2BX_8$. The strap $2BX_3$ is electrically connected to a movable member $2BX_{12}$ which carries the movable contact $2BX_1$ and is mechanically coupled through a pin $2BX_9$ to a U-shaped leaf spring $2BX_{10}$. The base of the spring $2BX_{10}$ is mechanically and electrically connected to a spring $2BX_{11}$ which is electrically connected to the input end portion $2BX_2$ of the circuit element 2BX.

Normally, the spring $2BX_{11}$ maintains the movable contact $2BX_1$ in engagement with the fixed contact $2BW_1$. However, when the solenoid $ST_2$ (Fig. 1) for the modules in the 2 tier is energized, this disengages the movable contact $2BX_1$ from the contact $2BW_1$ and causes it to engage the contact $2BY_1$. To this end, the spring is adapted to be depressed by an actuator $2B_3$ on a forked member $2B_4$ mounted on a pivot member $2B_5$. The upper end $2B_6$ of the forked member $2B_4$ is secured to an actuator rod $AR_2$ which is adapted to be moved longitudinally when the solenoid $ST_2$ (Fig. 1) is energized. The particular snap-action switch thus formed is no part of the invention and any other switching mechanism capable of performing the switching action desired may, of course, be used.

The circuit element 2BY has an input end portion $2BY_2$ lying beneath a plurality of laterally spaced connector holes $2B_o$—$2B_s$ formed in the terminal board $2B_1$. It also has an output terminal strap $2BY_3$ provided with a plurality of longitudinally spaced connector holes $2BY_4$—$2BY_8$. The element 2BY carries the fixed contact $2BY_1$ which is adapted to be engaged selectively by the movable contact $2BX_1$ as described above.

The circuit element 2BZ is a simple conducting path having an input end portion $2BZ_2$ underlying laterally spaced holes $2B_t$—$2B_w$ formed in the terminal board $2B_1$, and an output terminal strap $2BZ_3$ provided with longitudinally spaced connector holes $2BZ_4$—$2BZ_7$.

Figure 2B:
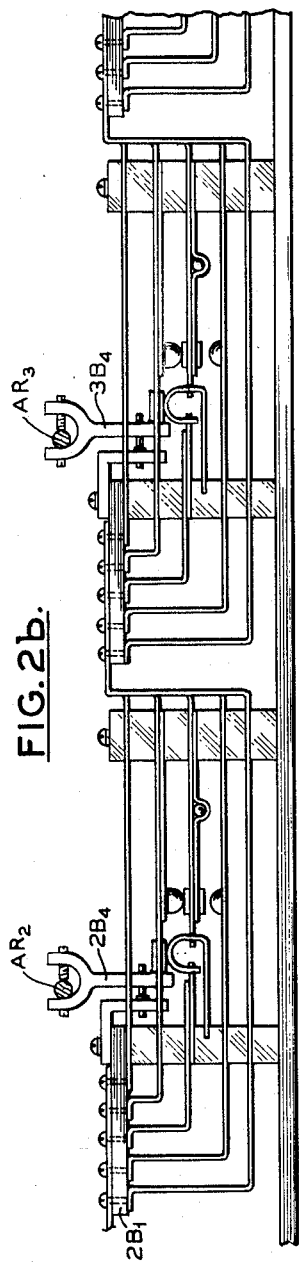
Figure 2A:
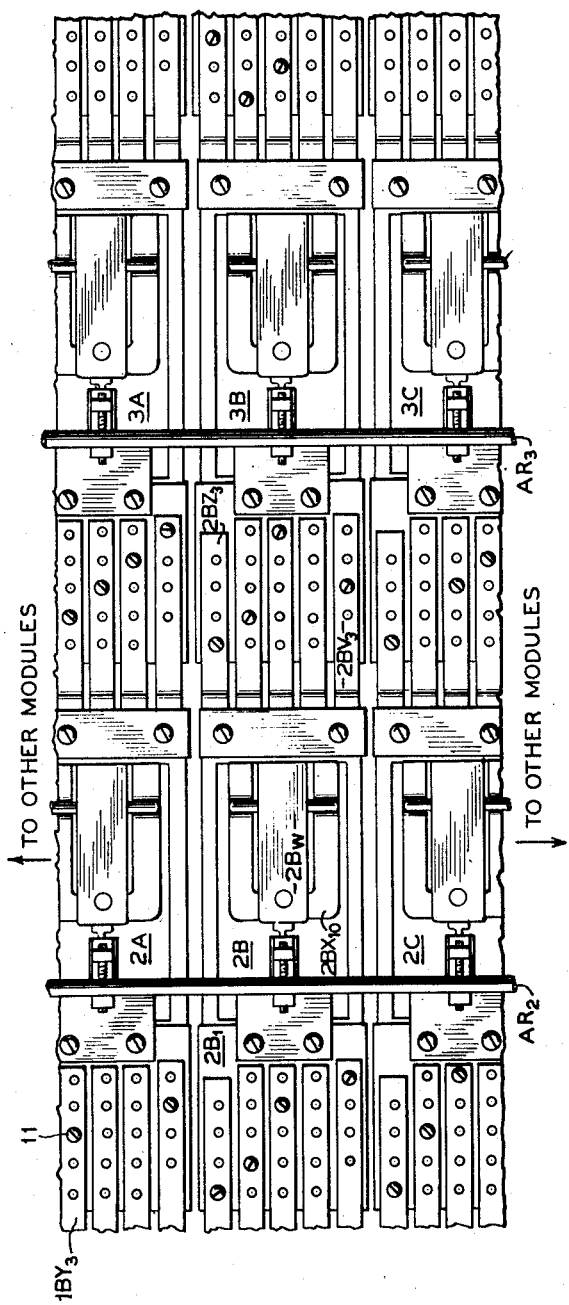
Fig. 2a is a plan view of part of a universal control assembly constructed in accordance with the invention.

As best shown in Fig. 2a, the modules are mounted in such relation to one another that the connector holes in the output terminal straps for any module be directly over the connector holes in the input terminal board of the next adjacent module in the same row. Accordingly, by inserting connector means such as screws, for example, into the holes in selected output terminal straps the output of any circuit element in a given module can be connected to the input terminal of any one or more of the circuit elements in the next adjacent module in the same row. Thus, the screw connector 11 (Fig. 2a) connects the output terminal strap $1BY_3$ of the circuit element 1BY of the module 1B to the input end portion of the circuit element 2BX (Fig. 3a) of the next adjacent module 2B in the same row.

At the beginning end of each horizontal row of modules, cable termination connection strips can be provided, having strap lugs that are somewhat similar to the lugs $2BV_3$-$2BZ_3$, inclusive, of the module 2B, to facilitate the making of appropriate connections between one or more cable terminations and the terminal plates of the modules of the first tier. Other terminations at the other end of each horizontal row of modules are also provided to enable connections to be made between the lugs of the modules in the last tier and other cables connected to the controlled items of the system.

A useful design aid, which is very useful in making initial trial solutions of any control problem, is a portable, light weight assembly of modular devices stacked in tiers as shown in Figs. 2a, 2b, 3a and 3b, hereinafter designated a "simulator." The modular devices may desirably be mounted on a panel in a suitcase, for example. A group of switches to simulate such control buttons, limit switches, etc., as may be required are mounted at one side of the panel, with a group of pilot lights, solenoids, meters or the like mounted at the other side of the panel to represent the devices to be controlled in the process for which the control system is being designed.

In the interest of clarity, a brief description now follows of one way in which the techniques and devices of the invention may be used to devise an automatic control system for a given process or sequence of operations. Of the many processes that might have been chosen for purposes of illustration, a typical process for slush molding plastisols has been selected for treatment. While this process is relatively simple when compared with others in modern industry, it affords a good illustration of how the novel design techniques according to the invention can be applied. The system has many interrelated and interdependent control factors. The molding operation cannot be carried along at any prescribed rate since variations in the curing time at certain points prevent a definite time production. Therefore, new molds are started to the filling position only as fast as previously introduced molds pass through the critical stages of the process.

Upon analysis by the system designer, it is found that the following steps are involved in the process:

(1) An open cavity mold is filled with a liquid plastisol;

(2) Gentle heat is applied to gel a thin layer of the plastisol against the inner surface of the mold;

(3) The ungelled liquid is poured out;

(4) Greater heat is applied to fuse the remaining layer;

(5) The mold and its contents are chilled in a water bath;

(6) The resultant (rubber-like) product is stripped from the mold. (This is a manual process since inspection of the product is required at this point. The inspector has certain switches and other controls at this position since he is the only operator present and must monitor the whole operation from this point); and (7) The mold is then hung up on a gravity conveyor rack where it is dried by circulating fans and returned to a storage rack for reuse later.

It is further found that, once a mold is filled, it can be set or hung on a continuously moving conveyor driven at a suitable speed in a closed path by means of which it can be moved to the heating ovens, dumping positions, chilling baths, etc., and to the inspection bench with only the usual mechanical clamping and tripping devices.

Upon further study of the problem, it develops that some twenty different powered items are required to be handled by the electrical circuits of the control system. However, many of these, such as the cooling and drying fan motors, the ovens, the vacuum and air pressure pump motors, the water circulating pumps and certain alarm circuits can be started and stopped at the same time. This permits a master power contactor to be used to energize all of these items at the same time. The design of a suitable automatic control system, therefore, involves the provision of suitable operating circuits to (1) start the process; (2) pick up and fill the molds as fast as they are needed; and (3) close down the operation at the end of the run in prescribed fashion.

Figure 6:
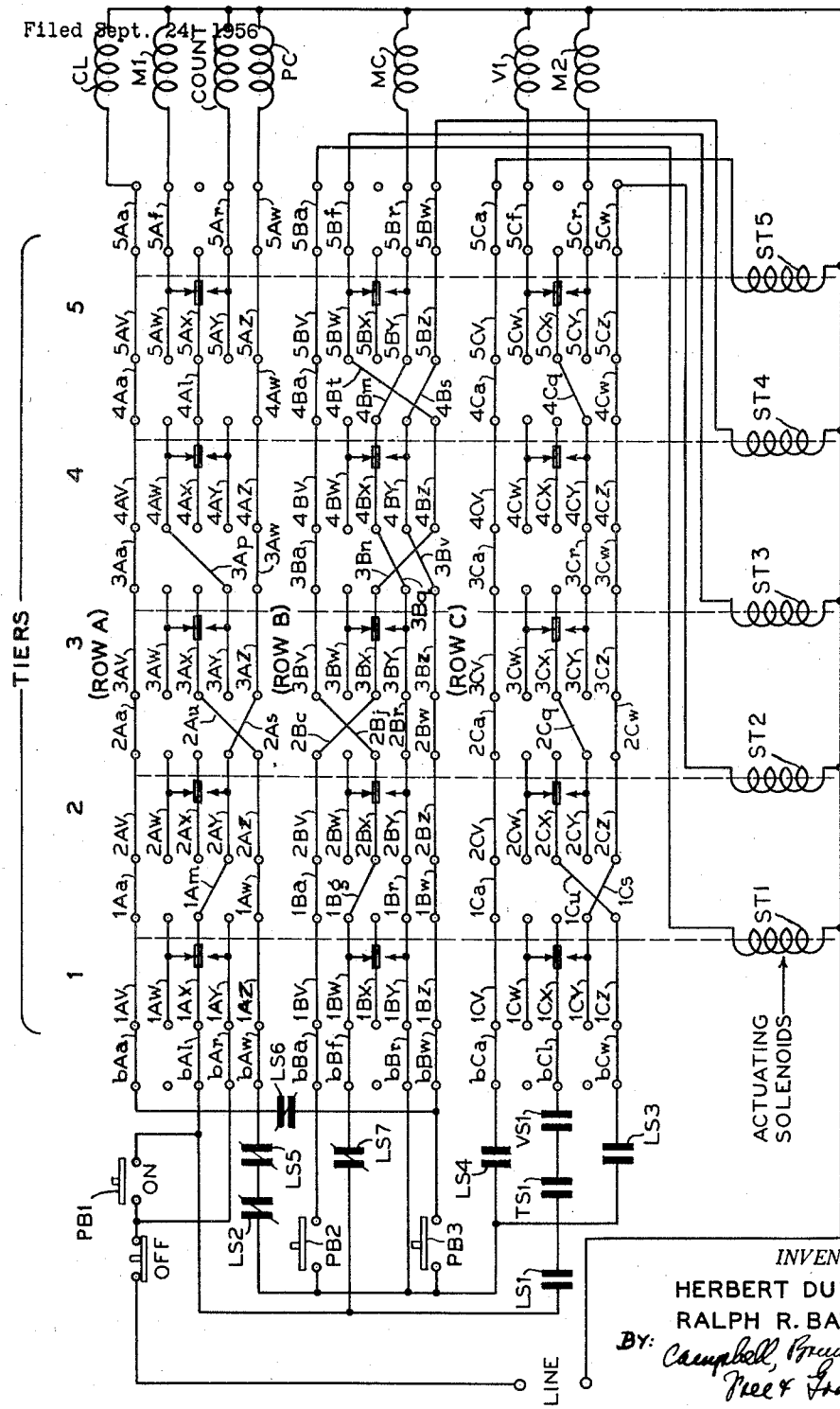
Fig. 6 is a schematic diagram illustrating how the connections between the several modules of a universal control assembly according to the invention would be made in the solution of a typical problem.

After the problem has been analyzed and the complete specifications have been determined, the designer may desire to set up one or more trial solutions on the simulator to ascertain the solution that is best suited for the problem at hand. As explained above, this involves making the proper interconnections between the elements in adjacent modules in several rows to establish circuits for initiating the several operations in the proper sequence. Fig. 6 illustrates schematically one possible solution of the specific problem outlined above set up on the simulator.

In Fig. 6, five tiers (designated 1 through 5, respectively) and three rows of modules (designated by the letters A, B and C) are used in the solution to this problem. Thus, the upper left module is designated 1A, and the lower module in the fifth tier as 5C, etc.

The feed-through conductors and the contact members within each module are designated by adding a final postscript letter (i.e., V, W, X, Y and Z) after the particular module designations. Thus, the elements of the first module in the top or A row are designated 1AV through 1AZ, respectively; the second module in this row by 2AV to 2AZ, respectively, etc., as described above in connection with previous figures.

The connection links between the several elements of the modules are designated by combining the numeral for the tier, the letter for the row, and a lowercase letter, the latter corresponding to the subscript letter for the corresponding input connection to the particular module. As shown in Fig. 3, there are 23 possible input positions $2B_a$–$2B_w$ for the module 2B and for each of the modules, although only rarely will more than four be used.

The input connections between the initiating switches and sensing elements and the input connections to the modules are designated by combining the letter $b$ with the letter for the particular row, and a postscript letter from the group $a$–$w$, inclusive, correponding to the possible 23 module input positions mentioned above.

The foregoing universal designation system not only facilitates a detailed description of the circuit, but it also illustrates how a code can be used to transmit all connection information from the field to anyone desiring to assemble and wire a group of mass-produced stocked module elements without elaborate drawings.

Referring now to Fig. 6, the operation is started by a pushbutton PB–1 which when depressed completes a circuit through the leads $bA1$, $1Am$, $2As$, $3Aw$, $4Aw$ and $5Aw$ to energize a master relay PC which simultaneously puts the powered elements utilized in the process in their normal operating condition. At the same time, the actuating solenoid $ST_1$ for the tier 1 is energized through the normally closed contacts of a limit switch LS–7 (another of the auxiliary aids serving as functional switches that are available on the simulator) and the connections: $bBf$, $1Bg$, $2Bj$, $3Ba$, $4Ba$, and $5Ba$. Operation of the solenoid $ST_1$ causes all of the switching elements of the modules in the tier 1 to be transferred. This connects the elements 1AX and 1AY of the module 1A, maintaining the circuit that was established by the operation of the pushbutton PB–1, even after this button is released. The holding circuit is over the leads $bA1$ and $bAr$.

As stated, the operation of the master relay PC starts certain power devices and ovens, etc., that are enumerated above. When all of these devices are operating normally and the ovens are up to the correct heat, a circuit is completed through the leads $bAr$, $bA1$, the switches LS1, TS1, VS1 (also provided on the simulator) and the leads $bC1$, $1Cs$, $2Cw$, $3Cw$, $4Cw$, and $5Cw$, which operates the drive solenoid $ST_2$ for the modules in the tier 2. As a result, the contacts of all modules in this tier are switched. The switches LS1, TS1, and VS1 monitor the starting up period, preventing a premature start. LS1 checks and insures that there are empty molds in the storage area, on racks and available for use; TS1 is a thermal switch that closes only when the ovens are at the correct temperature (there may be several of these in series, one in each oven); and a viscosity indicating switch VS1 measures and indicates the consistency of the plastisol material in the tank. The circuit is complete to the lead $bC1$ only if all of the switches in this group are actuated, so that the process is delayed until all operating conditions are correctly met.

A failure of any of these switches to operate or the release of any of them at a later time will release the second tier actuator solenoid $ST_2$ and stop the process. These monitoring or sensing devices, as well as others that will be referred to later, are not unlike those commonly used by industry for such services, which function to control a circuit when temperature, pressure, flow, or physical contact with items within the process, or other conditions are met, and so will not be described in detail. Many types of these devices are known to this field in industry.

When the solenoid $ST_2$ is energized and the contacts of the modules in the tier 2 are switched, power from the leads bBf and 1Bg is applied through the engaged contacts on the module 2B to the leads 1Br and bBr to permit other circuits to function later if connected to the lead bBr. Also a motor starting switch MC is energized through the interconnections 2Br, 3Bq, 4Bm, and 5Br. This starts the conveyor motor. At any time now the operator can start production by momentarily depressing the push switch PB-2. This operates the solenoid $ST_3$ for the tier 3 through the leads bBa, 1Ba, 2Bc 3Bn, 4Bt, and 5Bf and transfers all the contacts of the modules in the tier 3.

The transfer of the contacts of the module 3B connects the elements 3BX and 3BY so that the solenoid $ST_3$ remains operated through the leads 5Bf, 4Bt, 3Bn, 2Br, 1Br and bBr, even after the push switch PB-2 is released.

A circuit is also completed through the leads bAw, 1Aw, 2Au and the connected elements 3AX and 3AY of the module $3A_1$, the leads 3Ap, 4A1 and 5Af which is adapted to energize a remote solenoid $M_1$ from the energized lead bBr, but only if limit switches LS-2 and LS-5 are not operated. The latter switches, respectively, insure that the height of the plastisol in the tank is above a certain level, and that no more than two filled molds are awaiting pickup at the pickup point of the conveyor. Filling the molds is a faster operation than subsequent operations so that the switch LS-5 prevents too many molds from getting filled at any time. The remote solenoid M-1 is adapted to operate a latch that releases a mold from the storage rack, which then travels by gravity to the filling position. When it is in place, a position-sensing switch LS-3 at that point is depressed by the weight of the mold.

The switch LS-3 connects power from the bBr lead to the filling valve relay V-1, which injects plastic material into the mold, through the leads bCw, 1Cu, 2Cq, 3Cr, 4Cq, and 5Cf, until a level-checking limit switch LS-4 is manipulated by the level float thereon. This closes the energizing circuit for the solenoid ST-5 for the fifth tier which circuit includes the level checking switch LS-4, and the leads bCa, 1Ca, 2Ca, 3Ca, 4Ca, and 5Ca.

The operation of the solenoid ST-5 deenergizes a relay V-1 which (by the opening of contacts connecting the elements 5CW and 5CX) releases the filling valve and energizes a release solenoid M-2 (by connecting the element 5CX to the element 5CY). The release solenoid M-2 operates a latch that permits the filled mold to roll on by gravity to the pickup point at the moving conveyor. The departure of the filled mold from the filling station releases the switch LS-5 and deenergizes the solenoid ST-5 which restores the module contacts in the 5 tier to their initial positions.

At the time of operation of the solenoid ST-5, a production counter is also operated through the same circuit that operated the relay M-1, this being effected by the closure of contacts connecting the elements 5AX and 5AY and the lead 5Ar. This tallies up one count on the counter.

The release of tier 5 solenoid ST-5 energizes the solenoid M-1 which releases another mold to be filled. When this mold reaches the filling station, the tier 5 solenoid ST-5 again operates over the same circuits, provided that no more than two molds are awaiting pickup, as determined by the switch LS-5. The subsequent operations are repeated and production is automatic and continuous. The tier 5 solenoid ST-5 operates each time a mold is to be filled, unless any one of the sensing switches LS-1, LS-2, LS-5, VS-1 or TS-1 has been operated, in which event production ceases until the particular condition signalled by the operated switch has been rectified.

At the end of a run, it is necessary to insure that no partially completed items have been left on the conveyor. To this end, provision is made for closing down gradually so that all items are completed before the system is shut down. For this purpose, a switch PB-3 is provided, which, when depressed, energizes the switching tier 4 solenoid ST-4 through a circuit including the leads bBw, 1Bw, 2Bw, 3Bv, 4Bs, and 5Bw. The solenoid ST-4 is maintained energized after the push-button PB-3 is released by a hold-in circuit that is established through the leads bBr, 1Br, 2Br, 3Bq, and the engaged elements 4BX and 4BY, and 4Bs and 5Bw. The filling of new molds is interrupted by the opening of the contacts connecting the elements 4AW and 4AX which prevents the release magnet M-1 from being energized. Otherwise, the operation continues as before until all filled molds are picked up by the conveyor. The conveyor carries all filled molds through one complete revolution of the conveyor until they are deposited on the inspection bench. This is accomplished in the following manner:

A displacement type limit switch LS-6 with normally closed contacts is located at the point where the molds await pickup by the conveyor. The contacts of this switch are held open as long as any molds are standing at this point. When all filled molds have been picked up, the contacts of this switch close, establishing a circuit through the leads bAr, bA1, switch LS-7, bBf, 1Bg, 2Br, 3Bq, contacts 4Bx—4By, leads 3Bv, 2Bw, 1Bw, bBw, switch LS-6, and the leads bAa, 1Aa, 2Aa, 3Aa, 4Aa and 5Aa to energize a magnetic clutch coil CL. This clutch couples a rotating contact disc LS-7 through a gear reduction box to the conveyor motor drive. This gear reduction is such that one turn of the conveyor past all stations along its path of travel rotates this disc one revolution. Thus, when LS-7 the contact disc completes this revolution, its contacts momentarily open up, whereupon all power is removed from the circuit by the release of the solenoid ST-1 of the first tier of modules. The process is now completely shut down and can be started only by a repetition of the starting procedure from the beginning. The contacts on the contact disc LS-7 are designed to reclose after the system has shut down.

In Fig. 7 is shown, for comparison purposes, an equivalent diagram using standard symbols for the circuits illustrated in Fig. 6, set up by the designer on the simulator by making appropriate connections between the elements of the several modules.

It will be apparent that the solution set upon the simulator affords a good test of all connections constituting the several circuits, viz., those that connect the control and sensing items to the elements of the first tier of modules, those that interconnect the elements in the several modules and those that connect the elements in the last tier of modules to the external power devices that are to be controlled.

The foregoing process which was taken for purposes of illustration embodies one of the basic principles of automation, viz., the start of the operation at each part of the process is dependent on the status of a combination of associated conditions, each of which is handled by separate switching contactors electrically interconnected. It is probable that all industrial problems that arise where automatic control is desired can be handled by systems presently in use in industry, without recourse to the module system described above. However, such systems require an inordinate amount of engineering at all phases of their construction, installation and maintenance, and are not simple to design when complex automation problems are encountered.

With the system described herein, the elements are in horizontal alignment both on the circuit diagram and in their physical embodiment. Moreover, all interconnections are simple connecting links easily applied without recourse to diagrams or the use of hand-fabricated cables. The controlling conditions and factors in the system function in parallel operations across one dimension of a rectangular group of modules, and the controlled effects are initiated by circuits set up across the other dimension of the assembly.

In some cases, the simulator, or a like device connected in the same manner, may be used as the final control center of the system which is actually built. Usually, however, the power handling requirements are greater and the solution worked out on the simulator will be transmitted to the factory for the construction of a like device having elements scaled up to meet the power and other requirements involved. Simple and convenient means of listing the elements needed and coding the connections are inherent with the simulator for transmission to the factory for use in the construction of the control head to be used in installation. For example, a coded diagram or a photograph of the simulator showing the connections thereon might be sent to the factory for this purpose. Alternatively, information as to the connections on the simulator might be recorded on punched cards which could be used to control automatic machinery to construct a control head in accordance therewith.

The technique and means described above are in fact revolutionary developments in the field of control system design. They greatly facilitate the salesman's work in studying a customer's problem, enabling him to analyze what is needed, and to test several alternate solutions by comparing them with one another; they indicate what parts are needed in the final assembly, the final panel assembly, size and wiring as well as the necessary cabling to other parts of the system; and they enable the final solution of the problem to be transmitted back to the factory in a form which enables the fabrication, assembly and wiring of the equipment to be accomplished with a minimum of further engineering study or drafting work. The preparation of testing instructions, and installation instructions and the operating manuals for use in the plant, is greatly simplified due to the universal nature of the control head elements.

In the embodiment shown in Fig. 4, each of the modules is adapted to be actuated by its own electromagnet, and the coils of all electromagnets in each particular tier are wired, usually in parallel, to operate at the same time. In this form of the invention, all connection strips can be fabricated by the so-called printing wiring techniques, where the conductive elements are etched, plated, or otherwise affixed to the surfaces of the mounting panel. This is advantageous for some applications, inasmuch as it permits the use of plug-in relays of a universal type that can be mass produced to serve for many control systems. At higher power levels than can be accommodated by printed circuit conductors, heavier conductive straps can be stamped from sheet stock and affixed to the surfaces.

The interconnections between the elements of the modules are made by machine screws, rivets or metallic plugs which are inserted into holes extending through the panel as required to connect one or more of the five output terminals of one module selectively to one or more of the five input terminals of the next module.

In this embodiment, the switching elements of the modules are constructed in the form of removable plug-in units. This construction might be well suited for use in a simulator device, the plug-in units being adapted to be inserted as required in aligned rows of receptacles or sockets permanently wired to the coordinated grids of conductive strips attached to the panel. In the final control head, such removable switching units would have counterparts with heavier contacts that would be permanently mounted to the panels.

Referring now to Fig. 4, a portion of a modular assembly according to the invention is shown mounted on an insulating panel board 10′. Only the modules 2A′, 3A′, 1B′, and 2B′ are shown completely, since this is sufficient for purposes of illustration. Since the modules are substantially alike, only one, viz., the module 2B′ need be described in detail.

As in the modification shown in Figs. 3a and 3b, the module 2B′ in Fig. 4 includes five electrical elements 2BV′, 2BW′, 2BX′, 2BY′, and 2BZ′ which are formed as parallel conductive strips secured on the upper surface of the panel 10′. Formed in the ends of the elements 2BV′, 2BW′, 2BX′, 2BY′ and 2BZ′ are a plurality of holes 2B$a$′ to 2B$w$′ disposed in rows and columns as shown in the figure. The elements 2BV′ and 2BZ′ are permanently connected directly and electrically to parallel conductive strips $2BV_3$′ and $2BZ_3$′ secured to the under surface of the panel 10′. The elements 2BW′, 2BX′ and 2BY′ are electrically connected to the terminals $2BU_6$, $2BU_5$ and $2BU_4$, respectively, of a conventional octal socket 2BU mounted on the panel 10′.

The terminals $2BU_3$ and $2BU_7$ of the socket 2BU are electrically connected, respectively, to two conducting strips P2$a$ and P2$b$ secured to the under surface of the panel 10′, which traverse all of the modules in the tier 2 and terminate in suitable terminals (not shown).

The terminals $2BU_8$, $2BU_1$ and $2BU_2$, respectively, are connected to conductive strips $2BW_9$′, $2BX_9$′, and $2BY_9$′ mounted on the upper surface of the panel 10′ and which constitute direct parts of the module elements 2BW′, 2BX′ and 2BY′, respectively. The strips are permanently directly electrically connected to spaced parallel conductive strips $2BW_3$′, $2BX_3$′ and $2BY_3$′ mounted on the under surface of the panel 10′, suitable means such as screws, rivets or plugs being used for this purpose.

The strips $2BV_3$′, $2BV_3$′, $2BX_3$′ and $TBZ_3$′ are provided with a plurality of holes $2BV_4$′—$2BV_7$′, $2BW_4$′—$2BW_8$′, $2BX_4$′—$2BX_8$′,—$2BY_4$′—$2BY_8$′, and $2BZ_4$′—$2BZ_7$′ disposed in rows and columns matching the rows and columns of holes 2B$a$′—2B$w$′ in the strips 2BV′, 2BW′, 2BX′, 2BY′ and 2BZ′. Further, the array of holes in the strips at the left of each module overlie the holes in the strips at the right of the preceding module so that the output of any element of one module can be connected to any element of an adjacent module merely by inserting screws in the appropriate holes to make the necessary electrical connections, much in the manner of Fig. 2$a$ and Fig. 2$b$.

The switching elements of the module 2B′ are contained in a plug-in unit 2BR (Fig. 5) housing a relay having a winding 2BS. The winding 2BS is connected to plug contacts $2BT_7$ and $2BT_3$ formed in the base 2BT of the unit and it is adapted, when energized, to move a movable contact $2BX_1$′ out of its normal position engaging a fixed contact $2BW_1$′ and into engagement with a fixed contact $2BY_1$′. The movable contact $2BX_1$′ is connected to the plug contact $2BT_5$ which is electrically connected within the unit to the plug contact $2BT_1$. The fixed switch contacts $2BW_1$′ and $2BY_1$′ are connected to the plug contacts $2BT_6$′ and $2BT_2$, respectively, which are in turn electrically connected in the unit to the plug contacts $2BT_8$ and $2BT_4$, respectively.

It will be apparent that when plug-in units as in Fig. 5 are inserted in the appropriate sockets in Fig. 4, a modular assembly is essentially like that of Figs. 2$a$ and 2$b$ in so far as functioning and use is concerned.

Obviously, other forms of relays and module arrangements are possible within the spirit of the invention. Also, the size, physical dimensions and separations of the conductive elements may vary within wide limits depending upon the current and voltage requirements in the particular system under consideration. Moreover, in the embodiment of Fig. 3, separate solenoids connected in parallel could be employed for the several modules in each tier, instead of the single solenoid there shown.

From the foregoing, it will be understood that the invention provides a novel and highly effective method of and means for facilitating the design of automatic control systems. It utilizes control elements that can be mass-assembled and stored with the knowledge that they will serve in any of the systems a company may be called upon to produce. Such systems can be devised, sold, manufactured and installed at very substantial savings in cost. They can be maintained with a minimum of training. Later expansions can be handled with simple extensions of existing equipment.

In many control problems, modules including switching means may not be needed in some tiers and rows. In such cases, jumpers or modules like those shown in Fig. 1 but without any switching contacts may be used to carry the connections through to the next module in which switching means are used.

The specific embodiments described are intended to be merely illustrative, and numerous modifications in form or detail may be made within the spirit of the invention which is defined in the following claims.

We claim:

1. In electrical control mechanism, the combination of an array of similar electrical modules comprising at least one row, each of said modules having a plurality of conductive paths therein, each such conductive path extending between first and second terminals spaced apart in the direction of the row, at least some of said modules having switching means operable to alter the connections between certain of the conducting paths in the module, and each of said first and second terminals including means enabling any second terminal of a module to be connected selectively to any first terminal of an adjacent module in the row.

2. In electrical control mechanism, the combination of a plurality of rows of similar electrical modules, each having a plurality of conductive paths, each such path extending between first and second terminals spaced apart in the direction of the corresponding row, at least some of said modules having switching means actuatable to change connections between certain of said conductive paths in the respective modules, means on each of said modules enabling connection of any second terminal of a module selectively to any first terminal of an adjacent module, and actuator means for the switching means of the modules in each of a plurality of groups of said modules, each of said groups including a module in certain of said rows.

3. In electrical control mechanism, the combination of a plurality of rows and tiers of similar electrical modules, each having a plurality of conductive paths, each such path extending between first and second terminals spaced apart in the direction of the corresponding row, at least some of said modules having switching means normally connecting two of said conductive paths and actuatable to connect one of said two conductive paths to a different conductive path, means on each of said modules enabling connection of any second terminal of a module selectively to any first terminal of an adjacent module, and actuator means for selectively actuating as a unit the switching means of the modules in each of said tiers.

4. In electrical control mechanism, the combination of a plurality of rows and tiers of similar electrical modules, each having a plurality of conductive paths, each such path extending between first and second terminals spaced apart in the direction of the corresponding row, at least some of said modules having switching means normally connecting two of said conductive paths and actuatable to connect one of said two conductive paths to a different conductive path, means on each of said modules enabling connection of any second terminal of a module selectively to any first terminal of an adjacent module, a plurality of electrical actuator means for selectively actuating as a unit the switching means of the modules in each of said tiers, and a plurality of electrical circuits, each of said circuits including one of said electrical actuator means and conductive paths of modules in one of said rows, respectively.

5. In electrical control mechanism, the combination of a plurality of rows and tiers of similar electrical modules, each of said modules having at least first, second and third conductive paths between first, second and third input and output terminals, respectively, and switching means normally connecting one of said conductive paths to another of said conductive paths and actuatable to connect said one conductive path to the third of said conductive paths, certain of said modules also including means enabling ready connection of any output terminal thereof selectively to any input terminal of the next adjacent module in the same row, and actuator means for selectively actuating as a unit the switching means of the modules in each of said tiers.

6. In electrical control mechanism, the combination of a plurality of rows and tiers of similar electrical modules, each of said modules comprising socket means having input, output and energizing terminals, a plurality of parallel input terminal extensions connected to said respective input terminals, a plurality of parallel output terminal extensions connected to said respective output terminals, the output terminal extensions of each module being disposed in closely spaced relation and at an angle to the input terminal extensions of the next succeeding module in the same row, means enabling ready connection of any output terminal extension of a module selectively to any input terminal extension of an adjacent module in the same row, and energizing conductors connected to the energizing terminals of the sockets in each tier.

7. In electrical control mechanism, a plug-in unit comprising a member mounting a plurality of plug contacts constituting input, output and energizing terminals, a relay having a winding connected to said energizing terminal plug contacts, a movable contact connected to first input and output plug contacts, and a pair of fixed contacts, one of said fixed contacts normally engaging said movable contact and being connected to second input and output terminal plug contacts, and the other of said fixed contacts being connected to third input and output terminal plug contacts.

8. An electrical control system module comprising a plurality of conductive paths, each such path extending between first and second terminals, switching means actuatable to change connections between certain of said conductive paths, a plurality of parallel terminal extensions connected to said respective first terminals and a plurality of parallel terminal extensions connected to said respective second terminals, said second terminal extensions being disposed at an angle to said first terminal extensions, both said first and second terminal extensions including means enabling connection of any second terminal of a module selectively to any first terminal of an adjacent module.

9. An electrical control system module comprising at least first, second and third conductive paths between first, second and third laterally spaced input and output terminals, respectively, laterally spaced first, second and third input terminal extensions extending in one direction, laterally spaced first, second and third output terminal extensions extending in a different direction, means enabling ready connection selectively to each of said input and output terminal extensions at spaced apart locations thereon, and switching means normally connecting one of said conductive paths to another of said conductive paths and actuatable to connect said one conductive path to the third of said conductive paths.

10. An electrical control system for controlling the operation of processing apparatus in response to processing conditions detected by the apparatus comprising at least one row of similar electrical modules each having a plurality of conductive paths, connecting means enabling the selective connection of any conductive path in one module to any conductive path in an adjacent module in the same row, at least one conductive path in the last module of the row being connected to a control device in the processing apparatus, switching means in each module adapted to alter connections between conductive paths within the module, and actuator means responsive to detection of a change of condition in the processing apparatus to actuate the switching means of a corresponding module to effect a corresponding change in the control device in the processing apparatus.

11. An electrical control system for controlling the operation of processing apparatus in response to processing conditions detected by the apparatus comprising a plurality of rows of similar electrical modules each having a plurality of conductive paths, connecting means enabling the selective connection of any conductive path in one module to any conductive path in an adjacent module in the same row, at least one conductive path in the last module of each row being connected to a control device in the processing apparatus, switching means in each module adapted to alter connections between conductive paths within the module, and actuator means responsive to detection of a change of conditions in the processing apparatus to actuate the switching means of at least one module in each row to effect corresponding changes in the central devices.

12. An electrical control system for controlling the operation of processing apparatus in response to processing conditions detected by the apparatus comprising a plurality of rows of similar electrical modules each having a plurality of conductive paths, connecting means enabling the selective connection of any conductive path in one module to any conductive path in an adjacent module in the same row, at least one conductive path in the last module of each row being connected to a control device in the processing apparatus, switching means in each module adapted to alter connections between conductive paths within the module, and actuator means electrically linked to a detecting device in the processing apparatus through the conductive paths of at least one row of modules and responsive to detection of a change of conditions in the apparatus to actuate the switching means of one module in each row to effect corresponding changes in the control devices.

13. An electrical control system for controlling the operation of processing apparatus in response to processing conditions detected by the apparatus comprising a plurality of similar electrical modules arranged in rows and tiers each having a plurality of conductive paths, connecting means enabling the selective connection of any conductive path in one module to any conductive path in an adjacent module in the same row, at least one conductive path in the last module of each row being connected to a control device in the processing apparatus, switching means in each module adapted to alter connections between conductive paths within the module, and actuator means responsive to detection of a change of conditions in the processing apparatus to actuate the switching means of the modules in each tier to effect corresponding changes in the control devices.

References Cited in the file of this patent

UNITED STATES PATENTS

| | | |
|---|---|---|
| 1,810,732 | Sanner | June 16, 1931 |
| 2,010,338 | White | Aug. 6, 1935 |
| 2,493,858 | Digest | Jan. 10, 1950 |
| 2,496,853 | Burns | Feb. 7, 1950 |
| 2,560,320 | Winkler | July 10, 1951 |
| 2,579,141 | Eckert | Dec. 18, 1951 |
| 2,723,368 | Curtis | Nov. 5, 1955 |
| 2,724,026 | Johnson | Nov. 15, 1955 |
| 2,799,837 | Powell | July 16, 1957 |